July 24, 1923.

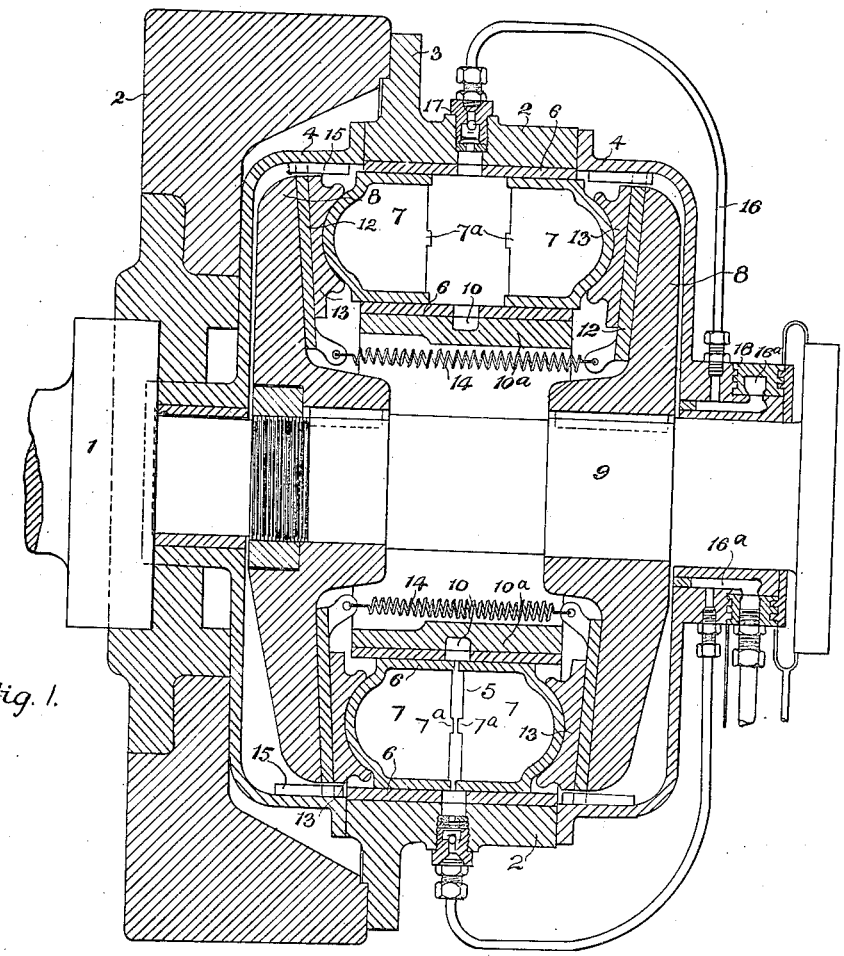
Fig. I.

H. S. HELE-SHAW

HYDRAULIC CLUTCH OR COUPLER

Filed July 16, 1919

Inventor
Henry Selby Hele-Shaw

July 24, 1923.

H. S. HELE-SHAW 1,462,600

HYDRAULIC CLUTCH OR COUPLER

Filed July 16, 1919    10 Sheets-Sheet 3

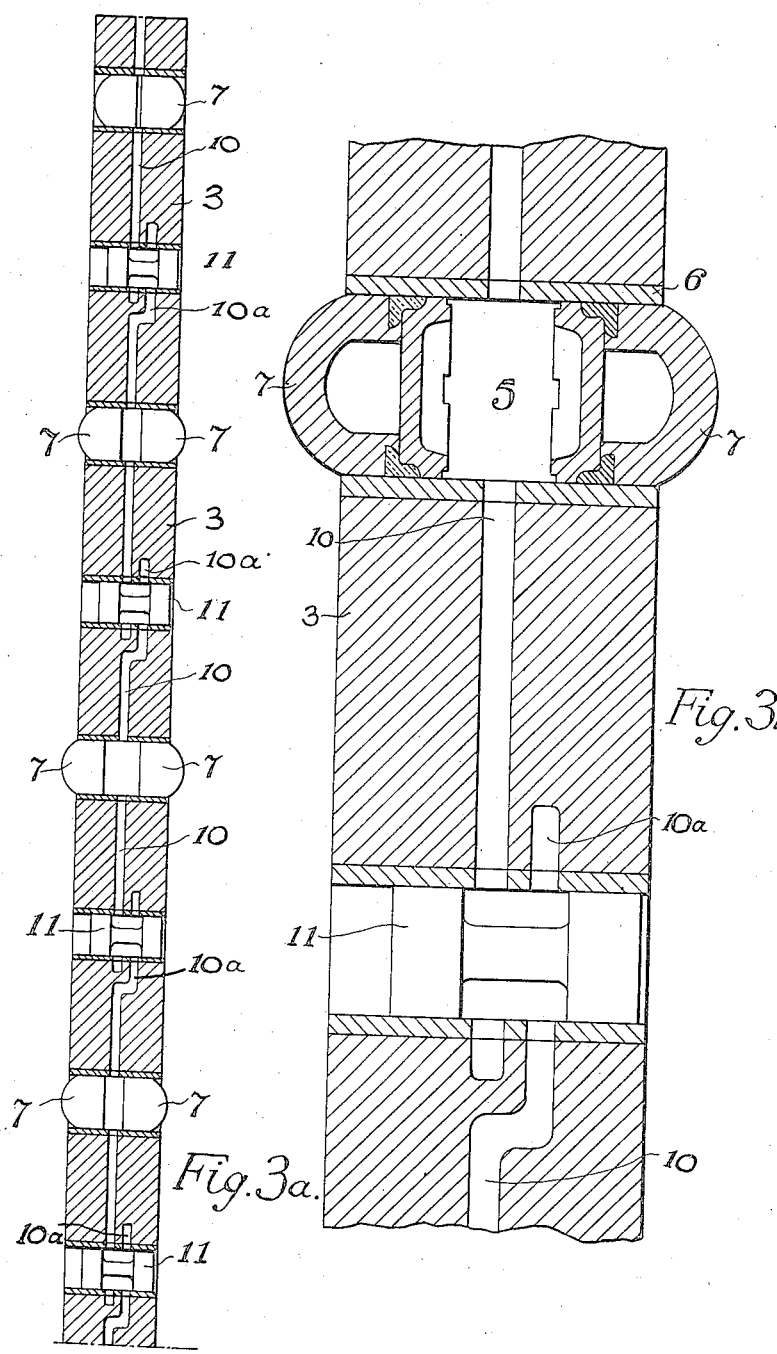

July 24, 1923.

H. S. HELE-SHAW 1,462,600

HYDRAULIC CLUTCH OR COUPLER

Filed July 16, 1919 10 Sheets-Sheet 8

July 24, 1923.

H. S. HELE-SHAW

HYDRAULIC CLUTCH OR COUPLER

Filed July 16, 1919   10 Sheets-Sheet 10

1,462,600

Patented July 24, 1923.

1,462,600

UNITED STATES PATENT OFFICE.

HENRY SELBY HELE-SHAW, OF LONDON, ENGLAND.

HYDRAULIC CLUTCH OR COUPLER.

Application filed July 16, 1919. Serial No. 311,311.

(GRANTED UNDER THE PROVISIONS OF THE ACT OF MARCH 3, 1921, 41 STAT. L., 1313.)

*To all whom it may concern:*

Be it known that I, HENRY SELBY HELE-SHAW, a subject of the King of Great Britain, and a resident of London, England, have invented certain new and useful Improvements in Hydraulic Clutches or Couplers (for which I have filed application for patent in Great Britain, No. 13,095, dated September 12, 1917, Patent No. 135,524), of which the following is a specification.

This invention relates to hydraulic clutches or couplers adapted to be employed for the purpose of coupling two rotatable members together so that they will revolve together at the same speed when locked or with a required difference of speed when the two parts of the clutch are slipping relatively to each other. Many attempts have been made from time to time to produce a hydraulic clutch and my invention has particular reference to that class of apparatus wherein reciprocating pistons are employed and means are provided for permitting free circulation of the working liquid and free reciprocation of the pistons when the two clutch parts—which for convenience may be referred to as the driver and the follower respectively—are required to be disconnected or declutched the one from the other, and preventing circulation of the liquid and reciprocation of the pistons when the two parts are required to be locked together to rotate at the same speed. It follows of course that any speed ratio between the driver and the follower can be provided for according as the circulation of the liquid is permitted more or less.

In hydraulic clutches there are certain difficulties which have to be overcome in order to ensure successful operation and in spite of many attempts no solution of these difficulties has been effected hitherto, and in order to make my invention better understood I will first set forth the principal difficulties which have to be met in order to produce a workable device.

In the first place, since the clutch must be of moderate dimensions, the pressure in the working fluid will be considerable. Now there is no known means by which leakage can be entirely prevented between working parts under great fluid pressure, and unless means are provided for restoring the liquid to the working circuit or channel, the clutch sooner or later ceases to operate when the liquid has escaped. This difficulty has been recognized and it has been suggested to overcome it by introducing liquid to compensate for leakage through the heads of pistons operated from a crank. However, owing to the obliquity of the connecting rods such an arrangement presents difficulties in practice.

To make the matter clear, (see Figs. 10 and 11) let us suppose the usual case of two cylinders opposed to each other with the crank shaft between them, the common axis of the cylinders passing through the centre of the crank shaft. Let us suppose that the ends of the cylinders remote from the crank are closed, the cylinders being connected by a pipe. Take, in the first place, the position at which the crank is at dead centre, the left hand piston being at its outer end of the stroke, and the right hand end piston at the inner end of the stroke. Suppose the whole space represented by the volume of the pipe, and the closed volume of the cylinders full of liquid. Now move the crank through 90 degrees. Although the crank is now moved through half its angular travel towards the other dead centre the pistons will not—owing to the obliquity of the connecting rods—be in the middle of their stroke, but will each be a greater distance than half stroke from their outer ends. This, if the liquid has been drawn in by an automatic inlet valve, will result in there being now a greater volume contained within the cylinders and connecting pipe than was the case when the crank was at its dead centre. The presence of this excess of liquid, over and above the initial volume, makes it theoretically impossible for the crank to move from its mid position either direction, and the whole mechanism is completely locked, unless some means is provided for allowing this excess of liquid to escape. If however, a mechanism is used which conforms to the operation of a crank actuating a connecting rod of infinite length, the obliquity of the connecting rod is eliminated. It is an essential condition of my invention that the pistons co-operate with some form of mechanism corresponding to a crank giving to the pistons the movement which they would have, if actuated by a connecting rod of infinite length. One form of mechanism which complies with this condition is the swash plate cam which I have shown applied to my invention.

A further difficulty which presents itself is the declutching, uncoupling or disconnecting of the driver and follower. The difficulty in this case arises from the fact, that, in general, it is not sufficient merely to open the control valve to the fullest extent and relieve the pressure as even then the resistance to the circulation of the liquid in the closed circuit, although comparatively slight, may be sufficient to cause a drag between the driver and the follower militating against the satisfactory operation of the clutch. For instance in the case of a motor vehicle this drag might make the change of gear difficult if not impossible while in the case of a shaft clutch the drag might result in much loss of energy when the clutch was out of operation for long periods.

My invention has for its object the meeting of the foregoing difficulties and the provision of a hydraulic clutch capable of satisfactorily transmitting large powers, and the invention may be said to consist broadly of a hydraulic clutch comprising one member having pistons operating in cylinders which are open to a closed circuit or channel common to all the cylinders so that movement of one piston is accompanied by corresponding movement of another or others, a control valve for controlling at will the facility for circulation of the liquid in the closed circuit or channel, means for maintaining said circuit or channel full under all working conditions and a second member consisting essentially of some form of mechanism corresponding to a crank giving to the pistons the movement which they would have if actuated by a connecting rod of infinite length.

My invention further comprises in combination with the foregoing, means for permitting complete disconnection of the driver and the follower the use of a single cam of the swash plate type in conjunction with a thrust bearing, particularly for smaller sizes of clutch, and the use of two such cams with opposed pistons and the closed circuit located between them particularly for large sizes. Further features of the invention which may be specifically mentioned are the use of mechanically or hydraulically operated balanced control valves, the use of balanced automatic inlet supply valves through which the supply to the closed circuit or channel is replenished from time to time from the outer revolving case, the means whereby such valves are balanced against the effects of centrifugal force and the use of an external supply of liquid under pressure for maintaining the closed circuit or channel full in which case the outer revolving case is used to collect leakage. The feature may involve the employment of an outside reservoir for supplying the pressure liquid through a running joint or an auxiliary pump carried by the pump casing and driven independently or by gearing, and the use of mechanically or hydraulically operated supply valves. Further features of the invention will be gathered from the following description of examples of clutches constructed in accordance with my invention read in conjunction with the accompanying explanatory drawings in which—

Fig. 1 is a longitudinal section of one form of my improved clutch the section being taken through the pistons.

Figure 3C:
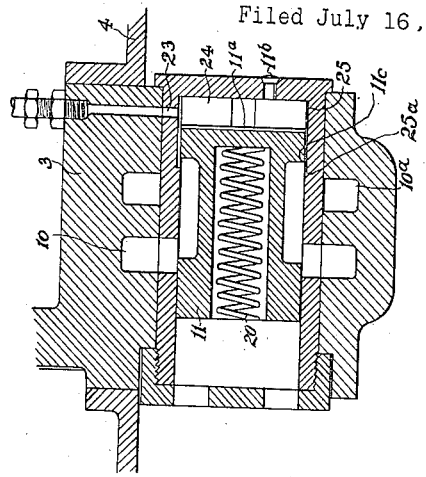
Fig. 3 is a view similar to Fig. 1 the section being taken through the valves instead of through the pistons.
Figure 2:
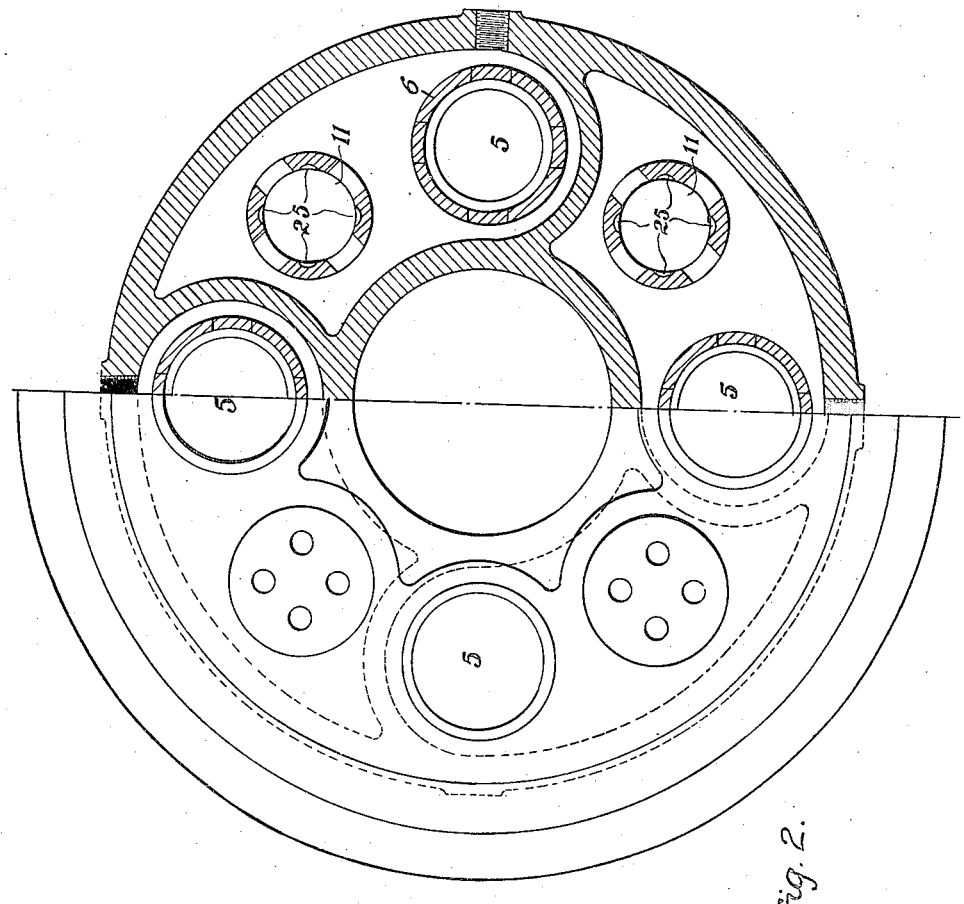
Fig. 2 is an end elevation of the same, partly in section.
Figure 3:
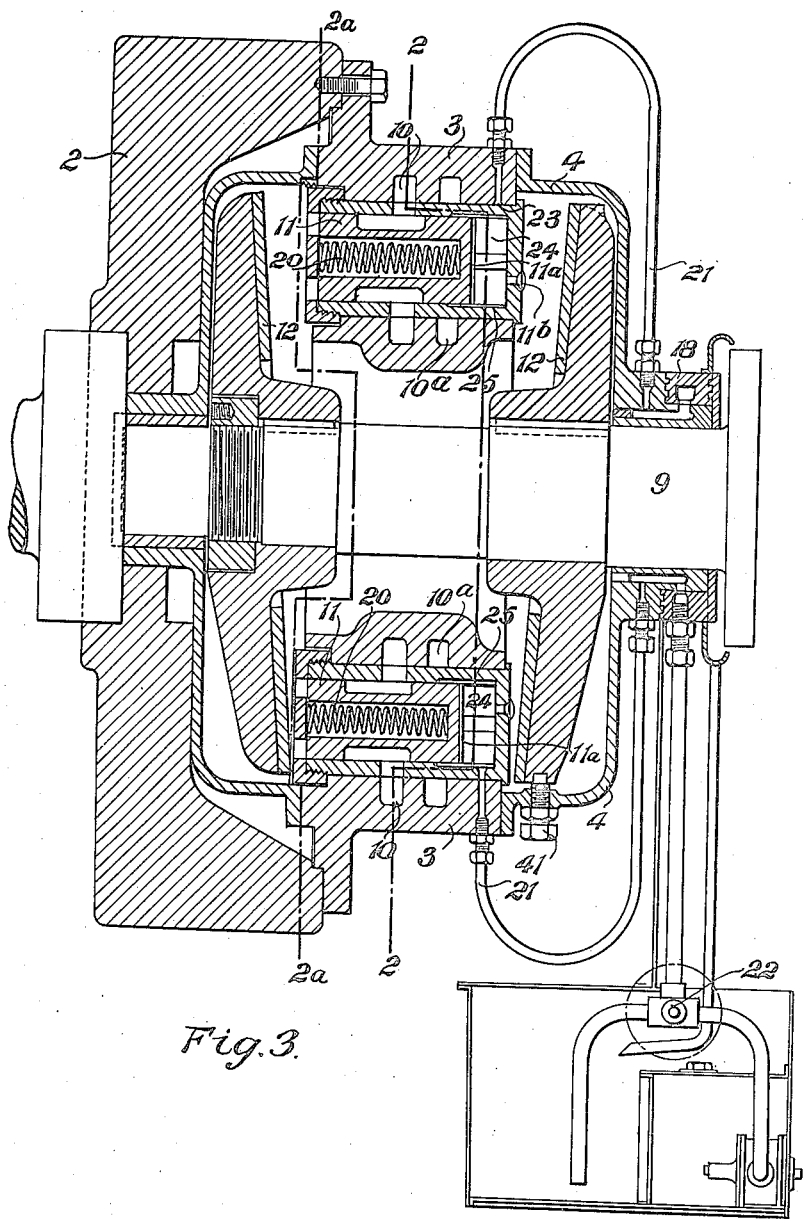

Fig. 3$^a$ is a diagrammatic view showing the closed circuit developed with the pistons and valves in their relative positions.

Fig. 3$^b$ is a fragmentary view to an enlarged scale of a portion of the circuit shown in Fig. 3$^a$.

Fig. 3$^c$ is an enlarged view illustrating a detail.

Figure 4:
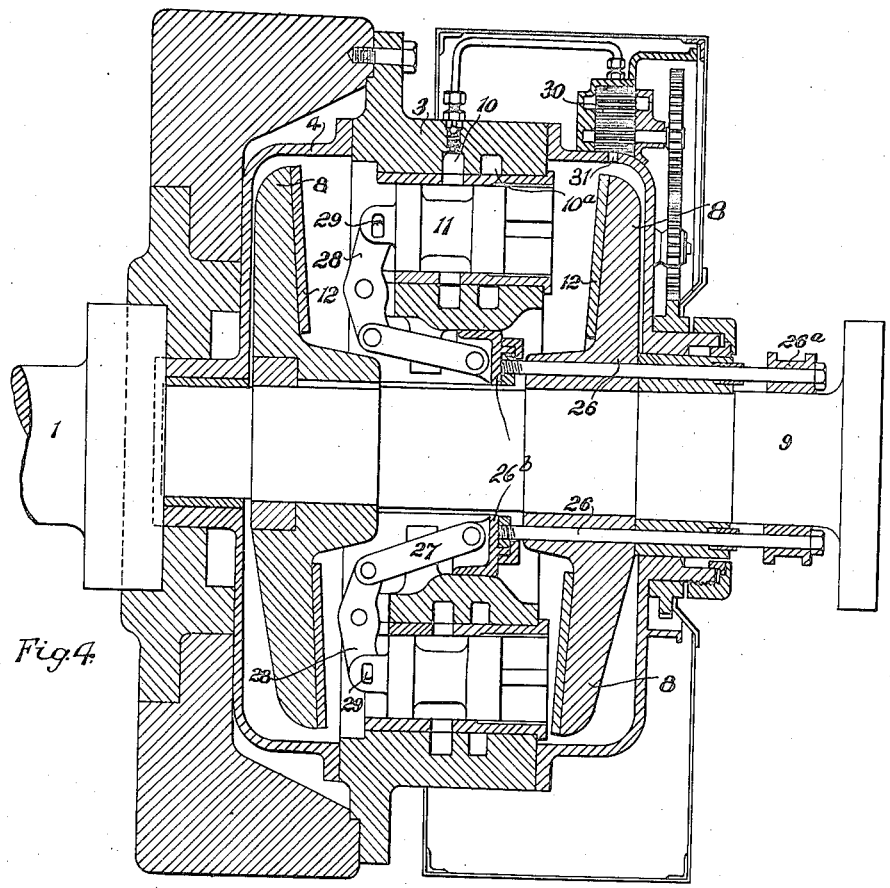

Fig. 4 is a longitudinal sectional view of a modified device.

Figure 5:
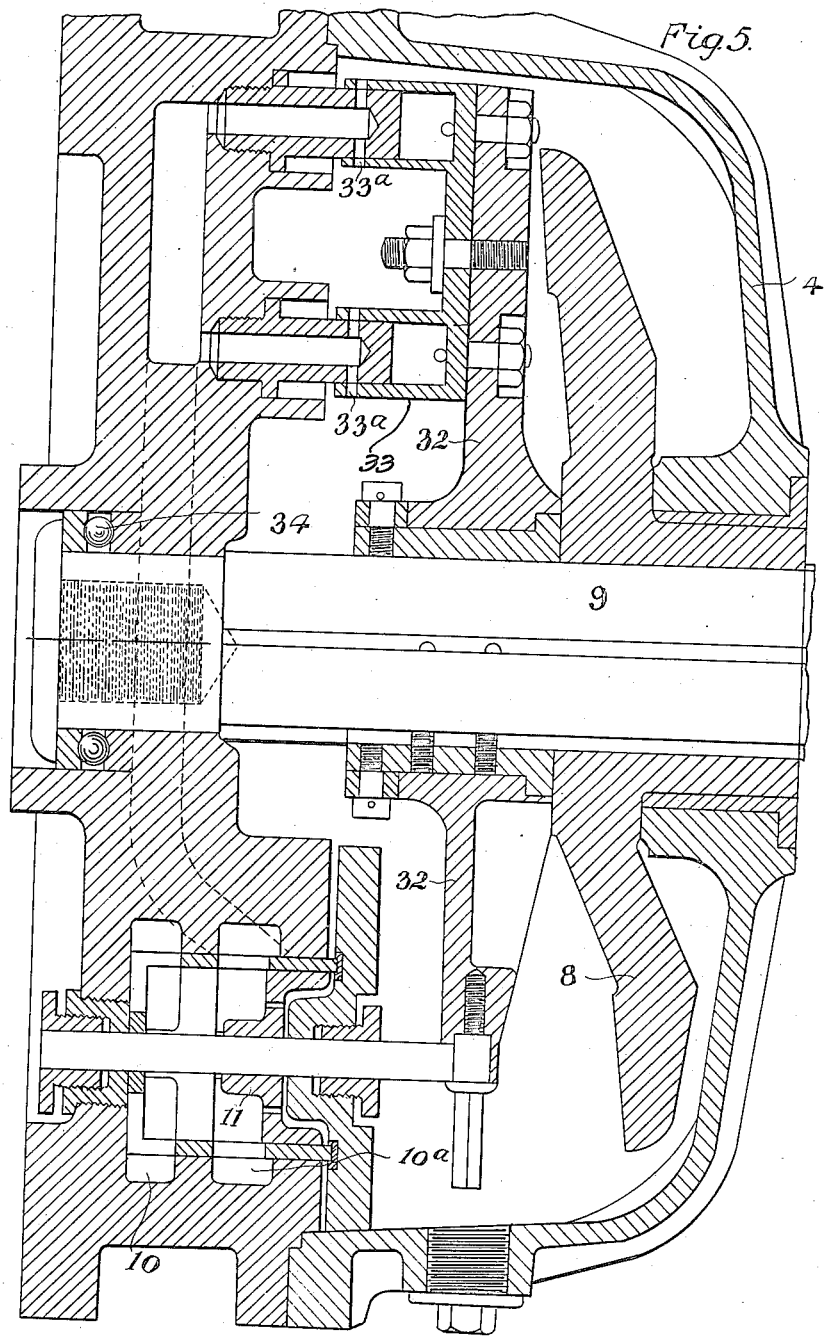

Fig. 5 is a longitudinal sectional view illustrating a form of my improved clutch where a single swash plate cam is employed, the section being through the valves.

Figure 6:
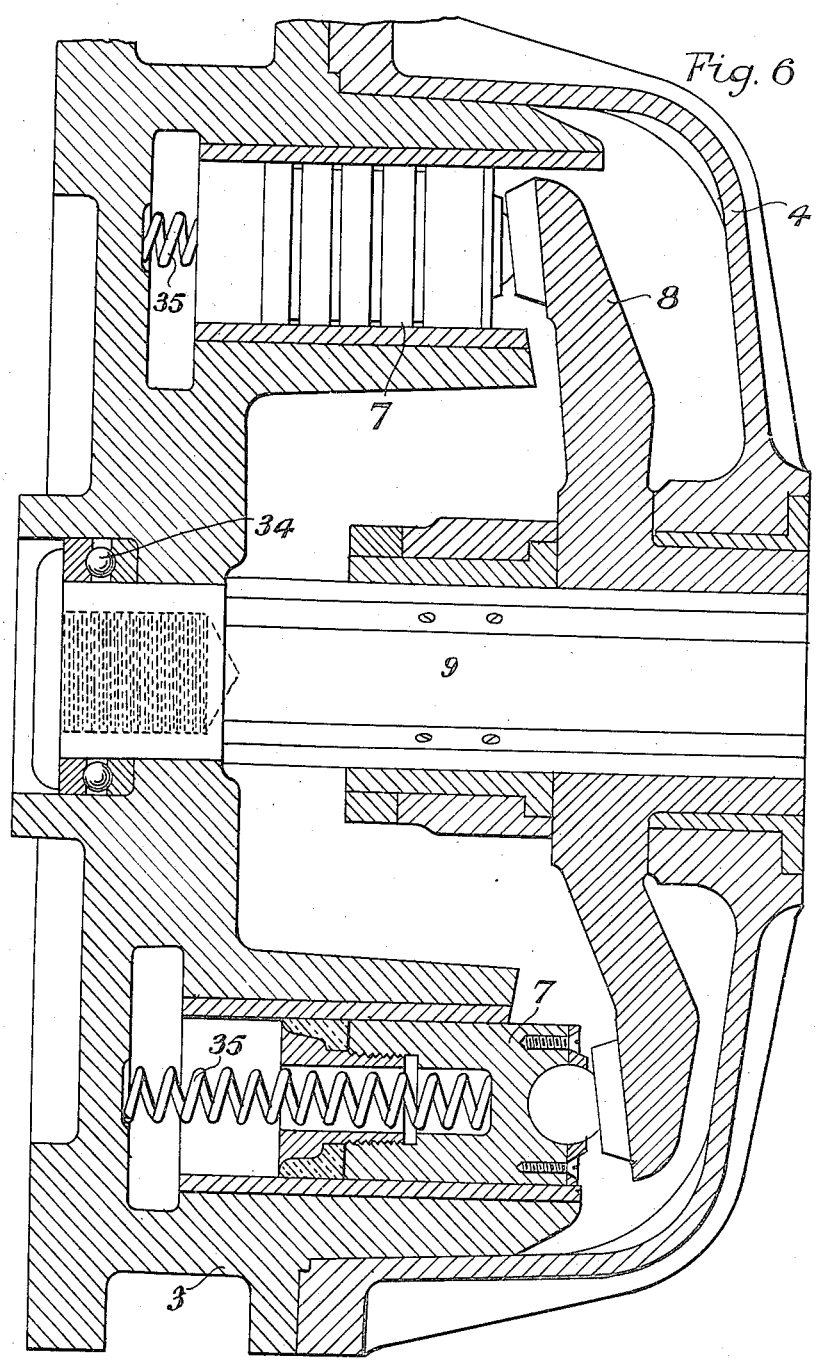

Fig. 6 is a similar view, the section being taken through the cylinders.

Figure 7:
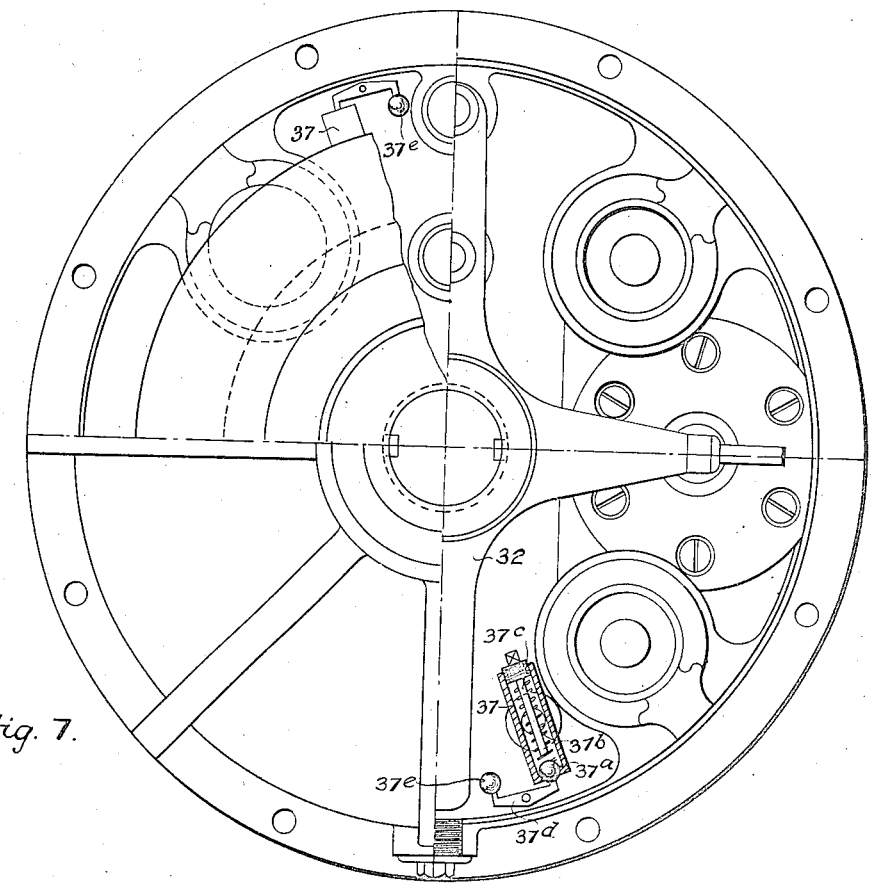

Fig. 7 is an end view partly in section thereof.

Figure 8:
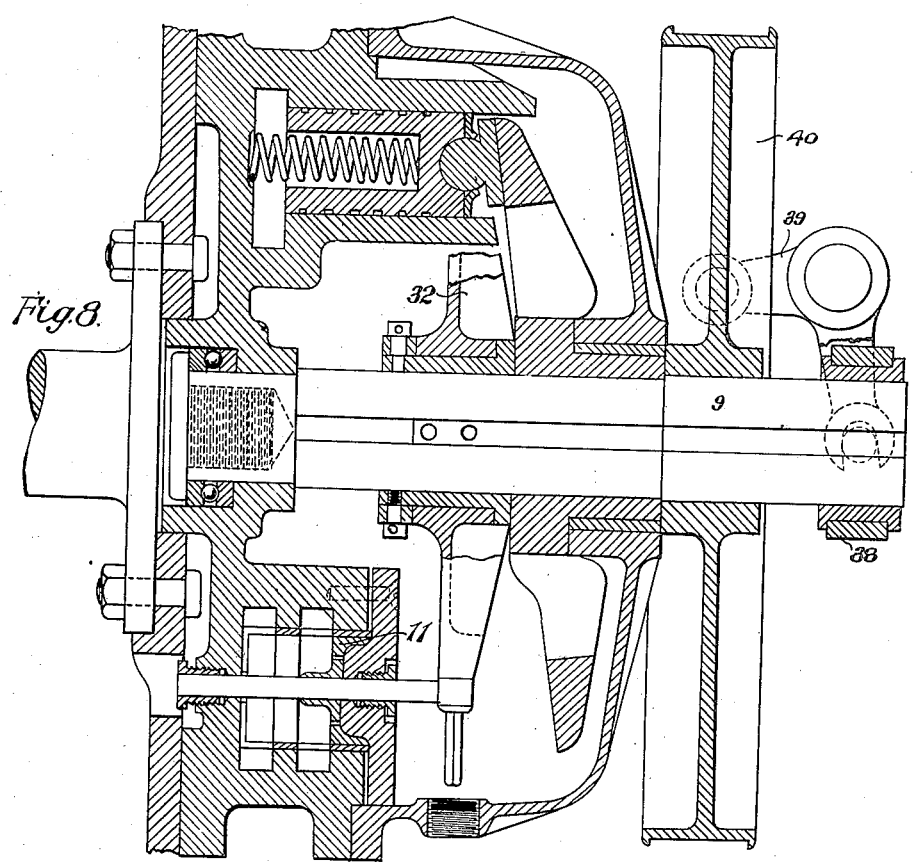

Fig. 8 is a longitudinal sectional view illustrating a modified form of the device shown in Figs. 5, 6 and 7, and Fig. 9 is an end elevation thereof.

Figure 10:
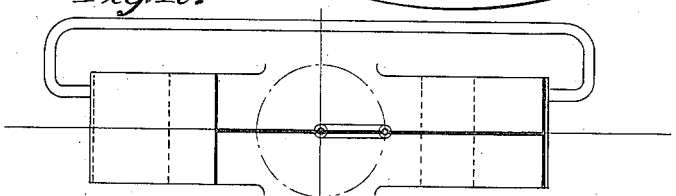
Figure 11:
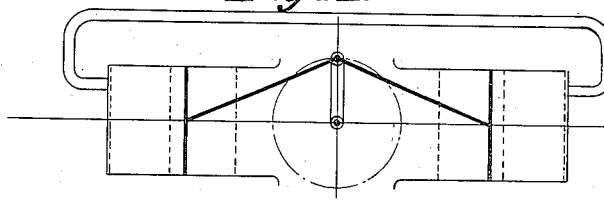

Figs. 10 and 11 are diagrams.

Referring to these drawings and particularly to Figs. 1 to 4 the numeral 1 designates the shaft of the prime mover which is connected in the usual way to the fly wheel 2 which is in turn coupled to the cylinder body 3, which together with its associated mechanism to be hereafter described, and the casing 4 constitutes the driver of the clutch. This cylinder body 3 has cylinders 5 provided with ported linings 6 and pistons 7 are mounted to reciprocate in these cylinders by co-operation with the swash plate cams 8, which constitute the follower of the clutch, and are keyed to the shaft 9 which is coupled to the mechanism to be driven. The cylinder body 3 is provided with an annular channel 10 and this channel 10 is in communication, under control of the control valves 11, with compartments or branches 10$^a$ which are stepped back or cut out of plane with the channel 10, the channel 10 and compartments 10$^a$ constituting the closed circuit before alluded to. The arrangement is illustrated diagrammatically in Figs. 3ª and 3ᵇ and is essentially such that with the control valves 11 in the extreme open position in one direction as shown in Fig. 3ª the liquid can circulate freely to and from the cylinders through the passages 10 and 10ª. In the other extreme and fully closed positions of the control valves 11 communication between the passages 10 and 10ª will be interrupted and there will be no facility for circulation except of course the small flow which may occur due to leakage—while in intermediate positions of the valve there will be a restricted circulation dependent upon the position of the valves. In other words the circulation will be throttled more or less according to the position of the valves 11. Now if it be assumed that the channels 10 and 10ª and the cylinders 5 be full of liquid and the valves 11 are open so as to permit free circulation of the liquid it follows that if one of the pistons 7 is pushed in another will be pushed out correspondingly. In other words the liquid will be simply pushed out of one cylinder into another, the pistons moving to accommodate the transfer. These pistons 7 as before indicated co-operate with the swash plate cams 8 in the usual and well known way. These cams are, however, according to my invention provided with annular rings or thrust plates 12 upon which the bearing members 13 are mounted, these bearing members having concave or other suitable bearing recesses in which the convex heads of the pistons 7 take their bearings. The annular rings or thrust plates 12 rotate with the cylinder body 3 and the one associated with the one cam is connected to the one associated with the other cam by means of springs such as 14 connected to their inner peripheral edges while the outer peripheral edges of these rings or plates 12 are at two diametrically opposite points constrained by guides 15 so that there is not rotational relative movement between the rings or plates 12 and the rotating cylinder body 3. It is to be noted that this guiding must be effected at the diametral points at which the movement of the swash plate is in a straight line. The purpose of these springs and guides will be explained more fully hereafter. Let it be assumed that the passages 10 and compartments 10ª and the cylinders 5 are filled completely with the working liquid which is preferably oil and the driver of the clutch, which as before mentioned comprises the cylinder body and its associated parts and the casing 4 be driven continuously by the prime mover. If the control valves 11 are in the fully open position to permit free circulation from one cylinder to another through the connecting channel or closed circuit formed by the channel 10 and compartments 10ª the pistons 7 will be free to reciprocate as they travel round the swash plate cams 8 and the latter, which constitute the follower of the clutch, will remain stationary and as a consequence no motion will be communicated to the shaft 9 which as aforesaid is connected to the mechanism to be driven. It is true that there will be a certain amount of torque transmitted to the cams 8 owing to the friction between them and the rings or plates 12 and the friction due to the viscosity of the liquid but this may be disregarded for the moment since in most cases it would be insufficient to overcome the inertia of the load upon the shaft 9. Thus while the driver of the clutch will be rotating at full speed the follower will remain stationary under these conditions. If now the control valves 11 be operated to gradually throttle the free circulation through the closed circuit the resistance between the driver and follower of the clutch will increase and the follower will commence to rotate and the speed of its rotation will depend upon the degree to which the free circulation of the liquid is interfered with until when the control valves 11 are fully closed and there is no facility for circulation there will be a liquid lock, the pistons 7 will not be able to reciprocate at all owing to the incompressibility of the liquid locked in the closed circuit and the follower of the clutch and the shaft 9 will rotate at the same speed as the prime mover and driver of the clutch. This of course is only theoretically true since owing to the high pressure it is probable that there will be a small relative movement or creep between the two owing to leakage. That is to say that in the fully clutched position although theoretically the driver and follower rotate at the same speed it is probable that the speed of the follower will be slightly less than that of the driver owing to slip which at the high pressure involved cannot be prevented entirely. As before mentioned the successful operation of the clutch involves as an essential the provision of some means for maintaining the closed circuit full of the working liquid under all working conditions. In the particular example now under consideration I propose to effect this by means of an external pressure supply which may be provided for by means of pumps carried by the casing and driven in any suitable manner and taking liquid from the casing and discharging it into the system or a head tank or reservoir under pressure may be provided. For the purpose of this description it is sufficient to assume that pressure liquid from some suitable source is supplied to the passage 16ª of a running joint 18 and pipes 16 leading to the non-return valves 17 between these pipes and the closed circuit aforesaid the running joint 18 being arranged to permit of the rotation of the casing 4. It follows that upon the instrokes of the pistons 7 liquid will be prevented from leaving the circuit by reason of the closing of the non-return valves 17 but upon the outstroke of these pistons any vacuum or unfilled space in the system will be automatically replenished through the valves 17 and any leakage from this circuit will thus be constantly replenished. As will hereafter appear my invention is in no sense to be regarded as confined to this particular system of replenishment since in smaller clutches particularly I propose to effect this replenishment from working liquid contained in the revolving case 4 through balanced automatic inlet valves. It will also be appreciated that it is necessary to provide some means for operating the control valves 11 at will. This can be effected by hand operation as will hereafter appear but in the present example I operate them hydraulically. Reference to Fig. 3 of the drawings will show that the valves 11 are dumb bell valves and are as a consequence pressure balanced and springs 20 tend to maintain them in the fully open position corresponding to free circulation. When it is required to close these valves pressure liquid from the external source of supply is admitted to the pipes 21 by operation of the cock or valve 22. This pressure liquid flows to the port 23 and then into the spaces 24 behind the valves. If the pistons are in their extended positions and the closed circuit is full the pressure acting on the ends 11ª of the valves overcomes the pressure exerted by the springs—which is the only pressure tending to keep the valves open and the valves therefore at once commence to close under the influence of this external pressure. If however the pistons should not be in the extended position the external pressure liquid will first flow through the small passages 25 and will move the pistons and completely fill up the closed circuit before the pressure builds up sufficiently to move the valves, the liquid being permitted to pass by reason of the shoulder 11ᶜ of the valve being beyond the ends 25ª of the passages 25 until the system is full and pressure rises sufficiently to move the valve from its open position. This will be clear upon reference to Fig. 3ᶜ which shows the valve 11 in its open position. So long as the pressure is maintained behind the valves 11 they will be held closed or in the position to which they have been set but immediately the pressure behind them is relieved—which is effected by opening the cock 22—the springs 20 will return them to open position and so free the clutch. Safety valves 11ᵇ are provided in the cylinder ends of the valve casing to prevent undue pressure occuring in the chambers 24 behind the valves.

It has been pointed out that when in the free position there will still be some torque transmitted to the follower of the clutch and although in many cases this may not matter there are circumstances when it is desirable that there should be complete freedom between the driver and follower of the clutch and it is a feature of my invention that this complete freedom is provided for. In the present example this is effected by the simple operation of relieving the pressure in the closed circuit by opening the cock 22 since when the valves 11 reach the fully open position pressure is at once relieved through the small passages 25 which come into communication with the interior of the valve by reason of the shoulder 11ᶜ passing beyond the ends 25ª of the passages 25, whereupon the springs 14 pull the two rings or thrust plates 12 together till they are free of the swash plate cams 8. Thus the driver and the follower of the clutch are entirely free one of the other. It should be mentioned that this particular arrangement is only possible where an external pressure supply is provided for filling and maintaining full the closed circuit, since in order to start up again it will be necessary to fill up the system again until the rings or plates 12 are forced again into engagement with the cams 8 against the influence of the springs 14. In order to prevent the opposing ends of the pistons coming too close together so as to prevent the re-entrance of liquid when the system is restarted projections 7ª may be provided.

Fig. 4 shows one method of operating the control valves mechanically instead of hydraulically and also shows how a pump for filling and maintaining full the system may be connected to the casing. In this figure the control valves 11 are operated by moving the collar 26ª to which the rods 26 are connected axially of the clutch the rods 26 being connected at their inner ends through the medium of the swivelling ring 26ᵇ to connecting links 27 pivoted to pivoted levers 28 connected to the valves by a pin and slot connection 29. It will be readily seen that movement in one direction will close the valves 11 and movement in the other will open them. The system is filled and maintained full by a suitable rotary pump 30 carried around with the casing and driven epicyclically the liquid being taken from the casing through the port 31 to which the liquid in the casing is directed by centrifugal force.

Figure 9:
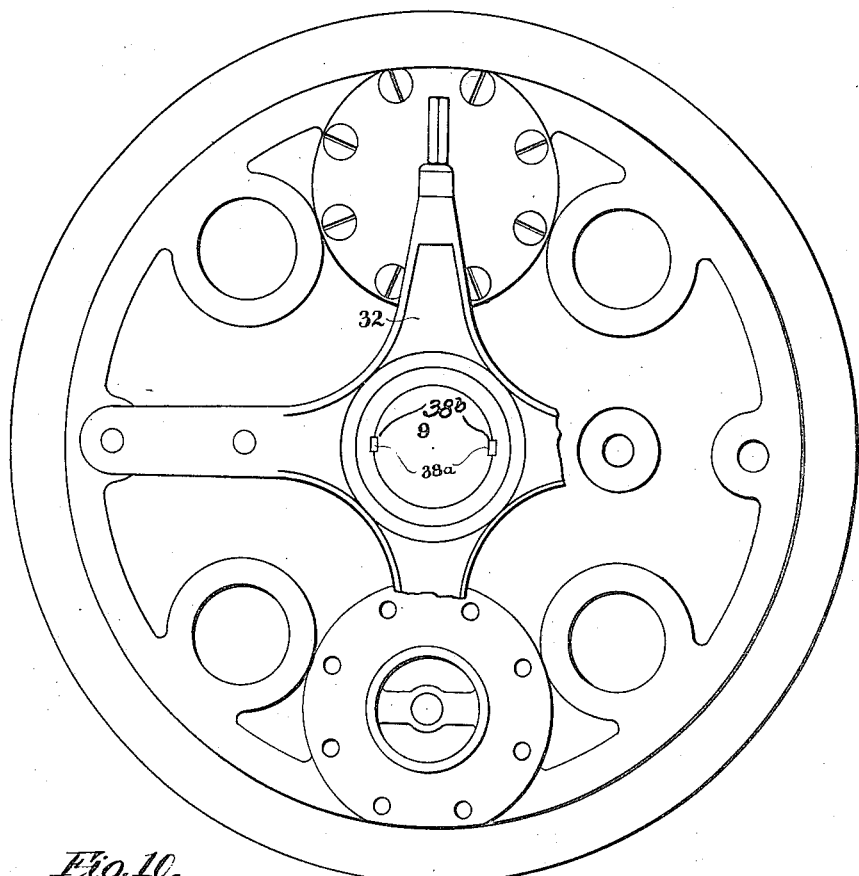

Figs. 5, 6, and 7 show an example of my invention where only one swash plate cam is employed and where mechanically operated control and supply valves are employed in conjunction with automatic balanced inlet valves. In this form the control valves 11 are connected to a spider 32 as also are the mechanically operated supply and pressure release valves 33 and the thrust of the swash plate cam 8 is taken by a ball thrust bearing 34. The valves 33 operate as supply valves since when these valves are in the position shown in Fig. 5 should there be any unfilled space in the closed circuit system centrifugal force will ensure replenishment through the ports 33$^a$ when rotation is first set up and before the valves are closed to effect clutching up and when these valves 33 are opened again in company with the valves 11 these ports 33$^a$ will form release ports to relieve the pressure within the system. The operation of the valves is effected by a direct sliding movement and the pistons 7 are maintained in engagement with the cam 8 by means of springs 35, the main object of which is to ensure the pistons moving outwards to the full extent should any leakage occur. The cylinders and channel are maintained full under all working conditions by means of the automatic inlet valves 37 through which liquid passes from the reservoir formed by the casing 4 whenever vacuum is created in the cylinders or closed circuit. It will be noticed that in this case therefore the replenishment of the system is effected under atmospheric pressure assisted by centrifugal force upon the liquid and in this respect it differs from the type of apparatus shown in Figs. 1–4 where the filling and maintaining full of the closed circuit is effected under an artificial pressure. The automatic inlet valves 37 consist of a ball 37$^a$ maintained upon its seat by a spring 37$^b$ and prevented from falling away by a stem 37$^c$. This ball constitutes a non-return valve but it is necessary to have regard to centrifugal force which acting on this ball would prevent it opening if some means of balancing or counteracting the centrifugal force were not provided. In order to counteract the centrifugal force acting on this ball I provide a pivoted lever 37$^d$ having a ball 37$^e$ equal in weight to the ball 37$^a$ of the valve. The lever 37$^d$ is centrally pivoted and the balls are located at the same radius, the ball 37$^a$ being loose but adapted to be acted upon by the end of the lever 37$^d$ adjacent to it while the ball 37$^e$ is attached to the lever at its other end. It will be apparent that by this means centrifugal force will be accounted for. The valves 37 operate as ordinary automatic inlet valves and when the pressure within the system becomes reduced owing to leakage, liquid gets past the ball 37$^a$ in the usual manner. The importance of the mechanically operated supply valves 33 is that they afford a means of releasing pressure when it is required to free the clutch. They are operated by the same movement as the control valves and in operation when the control valves 11 have been fully opened the ports 33$^a$ are also open to release the pressure in the system. In other respects the operation of the clutch is similar to that of the clutch described with reference to Figs. 1–4 except that only one swash plate cam 8 is employed and in fact this single cam clutch may be regarded as half the clutch shown in Figs. 1–4 a ball bearing being in this case required to take the thrust. Figs. 8 and 9 illustrate a simple arrangement for sliding the spider 32 and also show the provision of a brake stop for arresting the movement of the follower of the clutch immediately the control valve 11 has been fully opened. The shaft 9 is grooved as at 38$^b$ and connection rods 38$^a$ sliding in the grooves 38$^b$ are connected at their inner ends to the spider 32 and at their other ends to the sliding collar 38 and it follows that if the collar is moved along the shaft 9 the spider 32 and its associated valves will be correspondingly moved and I propose to provide a device such as the bell crank lever 39 for applying the brake to the wheel or drum 40, the arrangement being such that after the collar 38 has moved sufficiently to open the control valves 11 to their fullest extent a further movement in the same direction acting upon the bell crank lever 39 applies a brake to the wheel or drum 40 which is connected to the shaft 9 and thus arrests the movement of the shaft which otherwise might continue owing to inertia and friction. I propose to provide for use in emergency means such as the pegs or screws 41 (see Fig. 3) for positively connecting the driver and follower of the clutch together.

What I claim and desire to secure by Letters Patent is:—

1. A hydraulic clutch consisting of one member comprising pistons, cylinders formed in a cylinder body in which said pistons operate, a closed circuit consisting of a passage in said cylinder body with which all said cylinders communicate so that movement of the piston in one cylinder involves movement of the piston in another, a valve slidable in said cylinder body across said passage for controlling the facility for circulation of the liquid in the closed circuit, an automatically operating valve for admitting liquid into the closed circuit whereby said circuit is maintained full under all working conditions, and a second member comprising a mechanism, corresponding to a crank for giving to the pistons the movement they would have if actuated through a connecting rod of infinite length, cooperating with the pistons, substantially as specified.

2. A hydraulic clutch consisting of one member comprising pistons, cylinders formed in a cylinder body in which said pistons operate, a closed circuit consisting of a passage in said cylinder body with which all said cylinders communicate so that movement of the piston in one cylinder involves movement of the piston in another, a hydraulically balanced valve slidable in said cylinder body across said passage for controlling the facility for circulation of the liquid in the closed circuit, an inlet valve, means for automatically introducing liquid through said inlet valve into the closed circuit whereby said circuit is maintained full under all working conditions, and a second member comprising a mechanism, corresponding to a crank for giving to the pistons the movement they would have if actuated through a connecting rod of infinite length, cooperating with the pistons, substantially as specified.

3. A hydraulic clutch consisting of one member comprising pistons, cylinders formed in a cylinder body in which said pistons operate, a closed circuit consisting of a passage in said cylinder body with which all said cylinders communicate so that movement of the piston in one cylinder involves movement of the piston in another, a hydraulically balanced dumbbell valve slidable in said cylinder body across said passage for controlling the facility for circulation of the liquid in the closed circuit, an inlet valve, means for automatically introducing liquid through said inlet valve into the closed circuit whereby said circuit is maintained full under all working conditions, and a second member comprising a mechanism, corresponding to a crank for giving to the pistons the movement they would have, if actuated through a connecting rod of infinite length, cooperating with the pistons, substantially as specified.

4. A hydraulic clutch consisting of one member comprising pistons, cylinders formed in a cylinder body in which said pistons operate, a closed circuit consisting of a passage in said cylinder body with which all said cylinders communicate so that movement of the piston in one cylinder involves movement of the piston in another, a valve slidable in said cylinder body across said passage for controlling the facility for circulation of the liquid in the closed circuit, means for automatically introducting liquid into the closed circuit whereby said circuit is maintained full under all working conditions, an inlet valve through which said liquid passes, said valve being so arranged and constructed as to be unaffected by centrifugal force, and a second member comprising a mechanism, corresponding to a crank for giving to the pistons the movement they would have if actuated through a connecting rod of infinite length, cooperating with the pistons, substantially as specified.

5. A hydraulic clutch consisting of one member comprising pistons, cylinders formed in a cylinder body in which said pistons operate, a closed circuit consisting of a passage in said cylinder body with which all said cylinders communicate so that movement of the piston in one cylinder involves movement of the piston in another, a valve for controlling the facility for circulation of the liquid in the closed circuit, means for automatically introducing liquid into the closed circuit whereby said circuit is maintained full under all working conditions, an inlet valve through which said liquid passes, said valve being so arranged that centrifugal force does not interfere with its adjustment, and a second member comprising a mechanism, corresponding to a crank for giving to the pistons the movement they would have if actuated through a connecting rod of infinite length, cooperating with the pistons, substantially as specified.

6. A hydraulic clutch consisting of one member comprising pistons, cylinders in which said pistons operate, a closed circuit with which said cylinders communicate so that movement of the piston in one cylinder involves movement of the piston in another, a valve for controlling the facility for circulation of the liquid in the closed circuit, an automatically operating valve for admitting liquid into the closed circuit whereby said circuit is maintained full under all working conditions, means for relieving the pressure within the closed circuit when it is desired to free the clutch, and a second member comprising a mechanism, corresponding to a crank, for giving to the pistons the movement they would have if actuated through a connecting rod of infinite length, cooperating with the pistons, substantially as specified.

7. A hydraulic clutch consisting of one member comprising pistons, cylinders in which said pistons operate, a closed circuit with which said cylinders communicate so that movement of the piston in one cylinder involves movement of the piston in another, a valve for controlling the facility for circulation of the liquid in the closed circuit, an automatically operating valve for admitting liquid into the closed circuit whereby said circuit is maintained full under all working conditions, a second member comprising a mechanism, corresponding to a crank for giving to the pistons the movement they would have if actuated through a connecting rod of infinite length, cooperating with the pistons, and means for positively connecting the two members of the clutch in emergencies, substantially as specified.

8. A hydraulic clutch consisting of one member comprising pistons, cylinders in which said pistons operate, a closed circuit with which said cylinders communicate so that movement of the piston in one cylinder involves movement of the piston in another, a valve for controlling the facility for circulation of the liquid in the closed circuit, a supply and pressure release valve operated simultaneously with the control valve, an automatically operating valve so arranged and constructed as to be unaffected by centrifugal force for admitting liquid into the closed circuit whereby said circuit is maintained full under all working conditions, and a second member comprising a mechanism, corresponding to a crank for giving to the pistons the movement they would have if actuated through a connecting rod of infinite length, cooperating with the pistons, substantially as specified.

9. A hydraulic clutch consisting of one member comprising pistons, cylinders in which said pistons operate, a liquid circuit consisting of channels having overlapping parts communicating with a valve casing, a hydraulically balanced valve operating in said casing, means for operating said valve to control the flow of liquid from one branch of said liquid circuit to another, means for automatically admitting liquid into the liquid circuit whereby said circuit is maintained full under all working conditions, and a second member comprising a mechanism, corresponding to a crank for giving to the pistons the movement they would have if actuated through a connecting rod of infinite length, cooperating with the pistons, substantially as specified.

In witness whereof I affix my signature.

HENRY SELBY HELE-SHAW.